March 5, 1957 — R. KONWAY — 2,783,789
POWER DRIVEN CIRCULAR SAW
Filed Feb. 16, 1956 — 2 Sheets-Sheet 1
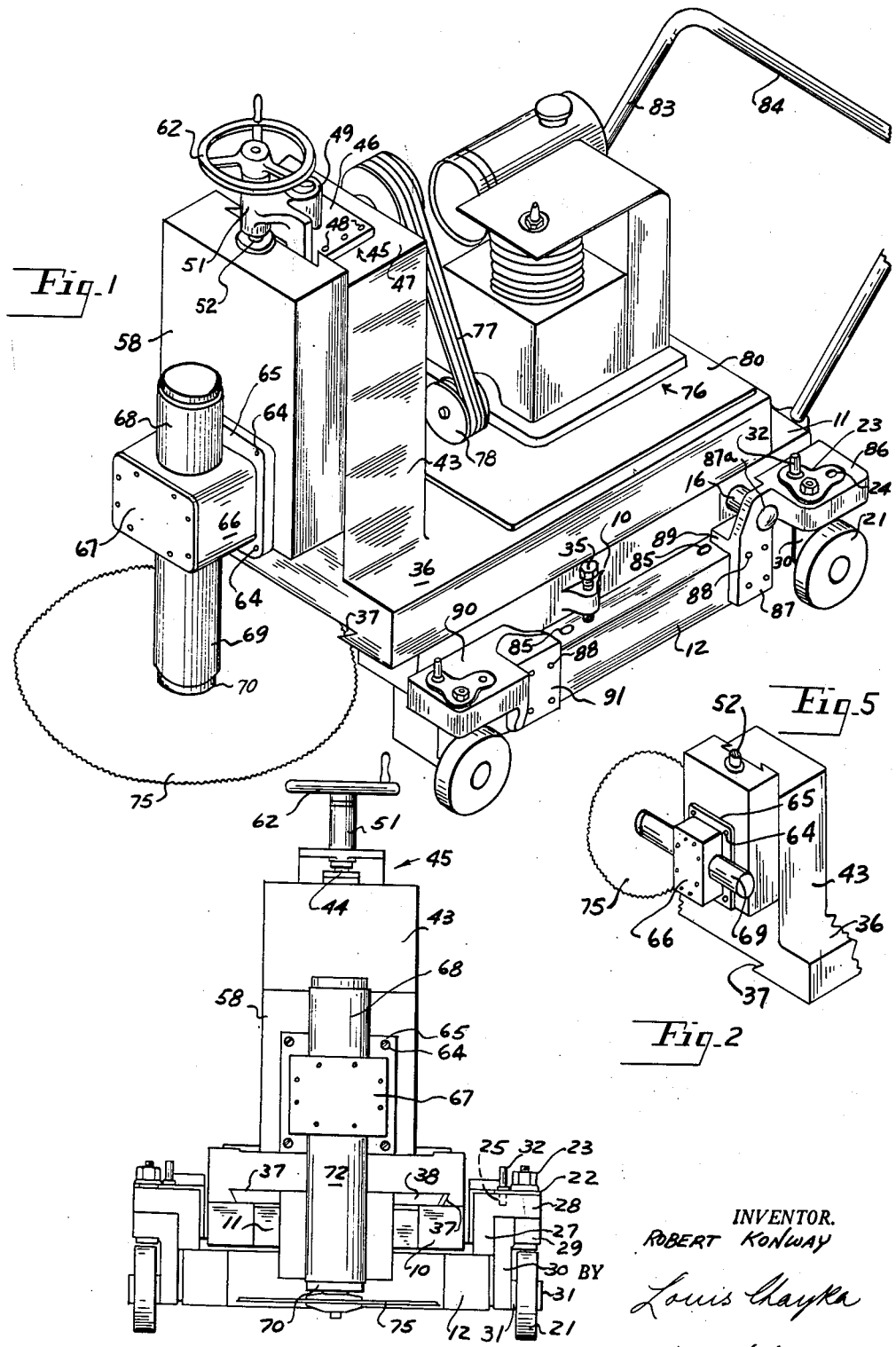
INVENTOR.
ROBERT KONWAY
BY Louis Chayka
ATTORNEY March 5, 1957 R. KONWAY 2,783,789
POWER DRIVEN CIRCULAR SAW
Filed Feb. 16, 1956 2 Sheets-Sheet 2

INVENTOR.
ROBERT KONWAY
BY Louis Chayka
ATTORNEY

United States Patent Office 2,783,789
Patented Mar. 5, 1957

2,783,789

POWER DRIVEN CIRCULAR SAW

Robert Konway, Inkster, Mich.

Application February 16, 1956, Serial No. 565,982

6 Claims. (Cl. 143—43)

My improvement pertains to a power-driven saw which, with a motor for supply of the necessary power, is mounted on a vehicular support, the saw being of a type which may be applied to operate on highly-resistant objects, such as concrete. My more specific object is to provide a saw capable of operating selectively in a vertical plane or a horizontal plane or at any angle to said horizontal plane, as desired.

A further object of the improvement is to provide a saw of a simple structural design including but a small number of parts and a few controls, but fully practical for the purposes to which it is to be applied.

I shall now describe my improvement with reference to the accompanying drawings in which:

Fig. 1 is a perspective view of one species of my saw;

Fig. 2 is a front elevational view of the saw, which is disclosed without the power plant included in Fig. 1;

Fig. 5 (Sheet 1) is a perspective view of the front portion of the saw, the view disclosing the saw blade in a vertical plane.

Similar numerals refer to similar parts throughout the several views.

Figure 3:
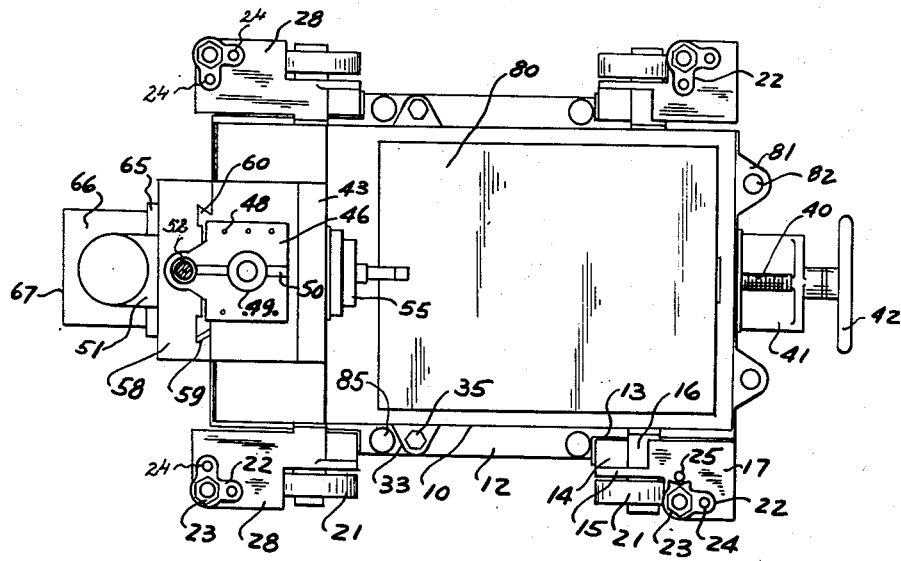
Fig. 3 is a top elevational view of the saw.
Figure 4:
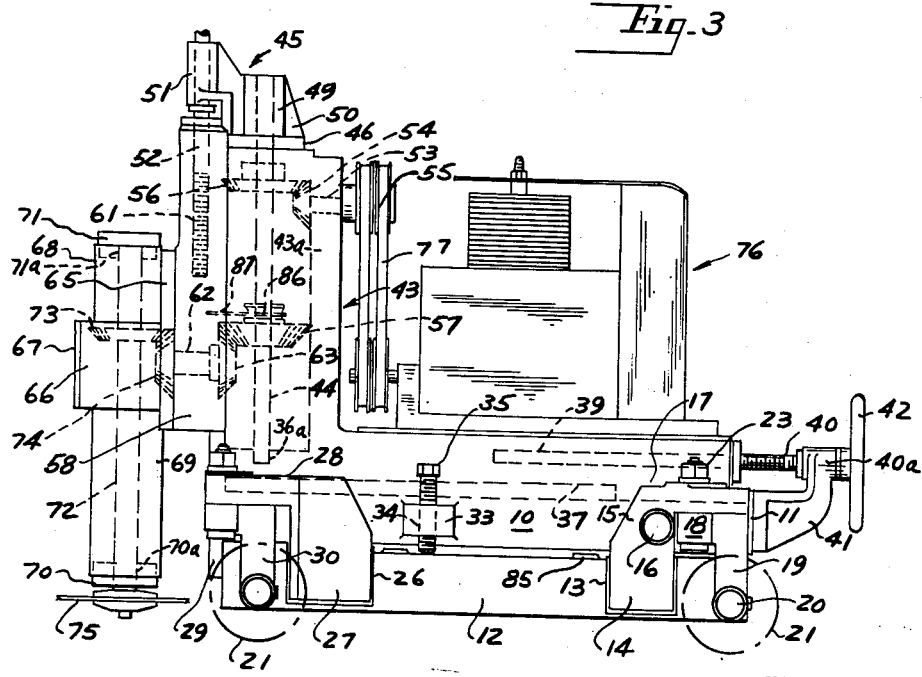
Fig. 4 is a side elevational view of said saw.

The saw which is shown in Figs. 2 to 4 includes a horizontally-disposed frame composed of two side members 10 disposed in a parallel but spaced relation to each other and of a transversely-disposed rear member 11 which is integrally connected thereto.

The frame rests on a low truck which includes two parallel beams, marked 12, each forming a side member thereof. As the two sides of the truck are identical, I shall limit my description to one of said sides. Disposed in a recess 13 in beam 12 is a vertical stand 14. The stand includes a member 15 which is provided with a bearing for reception of a horizontal pin 16 projecting laterally from each side 10 of the framework. The top of the standard includes a platform 17.

Journalled in the platform is a shaft 18, and secured thereto, in an eccentric position thereto, as shown in Fig. 4, is a vertical leg 19 which, at the lower end, is provided with a laterally-extending stub axle 20 serving as a mounting means for a ground wheel 21. Secured to the top of the shaft 18 is a horizontal plate 22 which contains two holes 24, the holes, when viewed from the shaft, as shown in Fig. 3, being in a 90 degree spacing from each other. A hole 25 in the platform serves for reception of a removable pin 32 which may be inserted into the hole through one of said holes 24. Threaded upon the upper end of the shaft is a plate-retaining nut 23. It will be understood that the shaft and the plate 22 are secured to each other in such a manner that the plate will move in an arc with the rotation of the shaft about its axis.

Similarly, at the front end of the truck, each beam 12 is provided with a recess 26 for reception of a stand 27 which, at the upper end, includes a horizontal platform 28. Journalled within the front end is a shaft 29 which, at its lower end, is joined to a vertical leg 30. The latter supports a horizontal stub axle 31 which carries a ground wheel 21. As in the case of the rear end platform 17, each front end platform 28 contains a vertical hole 25 for reception of a pin 32.

Integrally formed with each side member of the framework 10 is a boss 33 which contains a threaded vertical bore 34 containing an adjusting screw 35 which at the lower end bears against the upper surface of beam 12, as best shown in Fig. 4.

Mounted on the framework, including said side members 10 and the rear transverse member 11, is a heavy, flat base marked 36, the underside of the base being provided with a recessed keyway 37 for engagement with a stationary slide 38 which is mounted on the side members 10 of the framework. Midway its width, the base contains a threaded bore 39 opening into the body of the base from its rear end, and extending into said bore from said rear end of the base is a propelling screw 40. The outer end portion of the screw includes a portion devoid of threads, the portion being disposed in a bearing 40a in a bracket 41 which is secured to said member 11. A hand wheel 42, keyed to the end of the screw 40 in a position adjoining said bracket, serves for the operation of the screw.

Rising from the front end of the platform, and integrally connected thereto, is a vertical standard marked 43. The standard contains a hollow space in which a vertical shaft 44 extends from a bearing 36a in the base 36 upwardly above the top of the standard, where it is journalled in a cylindrical bearing 49 forming a part of a bracket generally marked 45. The bracket includes a base 46 secured to the top surface 47 of the standard by screws 48. The cylindrical bearing 49, reinforced by a radial rib 50, serves as a means of supporting another bearing 51 for a screw 52 to which I shall presently refer.

Disposed transversely in the rear wall 43a of said standard is a shaft 53 which, within the interior of the standard, is axially keyed to a bevel gear 54. At the opposite end, externally of the standard, the shaft supports a composite pulley 55.

The bevel gear 54 is in mesh with a similar bevel gear 56 which is keyed axially to said shaft 44. Axially mounted on the same shaft, in a vertically-sliding relation thereto, but keyed to said shaft for rotation therewith, is bevel gear 57. Secured to the front face of the standard, in a vertically-sliding relation thereto, is a rectangular solid slab 58 provided with a vertical keyway 59 for engagement with vertical keys or rails 60 on the front face of said standard 43. The slab contains a vertical bore 61 opening into the slab from the top, the bore being threaded for engagement with the already-named screw 52. Keyed to the top of the screw is hand wheel 62.

Within its lower portion, said slab contains a bearing for support of a horizontally-disposed shaft 62 which at one end is axially keyed to a bevel gear 63, the latter being in mesh with the bevel gear 57 on said shaft 44.

Mounted on the slab 58, on the face remote from the standard 43, by means of screws 64, is a mounting plate 65 which has an open central portion, and supported by the mounting plate is a gear box 66, the latter including a removable front cover 67.

Mounted on top of the gear box 66 is a cylindrical housing 68. A similar cylindrical housing 69 extends from the bottom wall of said gear box and is closed by a member 70 which is provided with a centrally-located bearing 70a. At the top, the housing 68 is equipped with a closure 71 which contains a bearing 71a for a vertical shaft 72. The shaft supports a bevel gear 73 which is driven by the bevel gear 74 on the shaft 62 already described herein. The shaft 72 serves as an arbor for a circular saw 75.

The power necessary for the operation of the saw is furnished by a motor, such as an internal combustion engine, mounted on base plate 80 and generally marked 76. Belt means 77 transmit the power supplied by the engine to the pulley 55 upon the shaft 53 in the standard 43.

As the truck which supports the engine and the elements operated thereby is adapted for hand wheeling, it is provided at the rear with two outwardly-extending ears 81, each of which contains a hole 82, the holes serving for engagement with two parallel legs 83 of a tubular U-shaped member which includes a transversely-disposed bar 84 affording means for a manual grasp thereon. Because the truck is also adapted to be wheeled laterally to its length, each beam 12 of the truck is provided with two sockets 85 for reception of said legs 83 of the U-shaped tubular member.

The drawing in Fig. 1 shows modified brackets for support of the ground wheels 21. As the brackets on one side of the truck are the same as on the other side, the following description will be limited to brackets on one side of said truck. The bracket shown at the rear of the truck includes a vertical plate 87 (Fig. 1) which is secured to beam 12 by means of bolts 88. Extending laterally from the plate 87 is a horizontal ledge 89 which extends over and rests on top of beam 12. The upper portion of the plate contains a bearing 87a for reception of a pin 16 which projects from the side member 10 of the framework of the saw.

Numeral 86 indicates a platform which is a part of the rear bracket and which, in all essential respects, is like platform 17 in Fig. 3. Secured to the front end of the beam 12 is another wheel-supporting bracket which is joined to the beam by bolts 88. The bracket includes a platform 90 which in all essential respects is like platform 28 in Fig. 3.

I shall now describe the operation of the saw:

As already stated, the blade of the saw 75 may be operated in a vertical plane or in a horizontal plane, which will be considered the normal operative position of the blade. The mechanism shown by me is such that the saw may be selectively raised or lowered to any desired operative level within the range of its vertical movement. This may be accomplished by means of the hand wheel 63 keyed to the screw 52. It is by means of said screw that the vertical position of the slab 58 and the horizontal level of the saw blade 75 may be adjustably brought to a desired height.

The necessary power for the operation of the saw is first supplied from the engine by belts 77 to the bevel gear 54 which, by means of a gear 56, drives the shaft 44. It is the last-named shaft which supports a sliding bevel gear 57. As said gear wheel 57 is capable of being moved vertically upon said shaft, it will always remain in mesh with the gear wheel 63, irrespective of any change in the vertical position of the slab 58. It is for the purpose of always keeping said gears 57 and 63 in mesh that the hub portion of the gear wheel 57 is embraced by a loop 86 which is a part of a rod 87 secured to said slab 58.

If it should be desired to have the blade 75 in an operative position at an angle to the ground on which the truck is located, the framework supporting base 36 may be swung upwardly from pins 16. This may be done by means of screws 35 disposed in bosses 33. By turning the screws clockwise, the base may be jacked up at the front till the blade will reach the desired angle.

Assuming again that the blade is to be employed in a vertical plane, this may be accomplished simply by loosening screws 64 which secure the gear box 66 to the mounting plate 65 and by turning the gear box at right angle to the normal position shown in Fig. 2, then by tightening the screws again.

The turning of the gear box may be effected without any difficulty because of the employment of the bevel gears between the arbor supporting the blade of the saw and the driving shaft 42 within the sliding slab 58.

It will be obvious that some changes may be made in the combination of elements shown by me, but that such changes might still be within the frame of the inventive concept disclosed herein.

What I, therefore, wish to claim is as follows:

1. A circular power-driven saw including an oblong base, a vertical standard at one end thereof, a vertical power-driven shaft within the standard, a gear wheel axially mounted thereon in a sliding relation thereto for rotation with said shaft, a member mounted upon the standard in a vertical sliding engagement therewith, screw means secured to the standard by intermediate means for adjustment of the vertical position of said member, a gear wheel mounted for rotation within said member but being constantly in mesh with the gear wheel mounted upon said power-driven shaft within the standard, a box mounted upon the vertically-slidable member, an arbor journalled within the box and extending therefrom, a circular saw mounted on said arbor, and gear means axially keyed to said arbor, said gear means being driven by the gear wheel within the vertically-sliding member.

2. A circular power-driven saw including a wheeled truck, a frame at one end pivotally supported thereby, screw means to jack up the front portion of the frame, a horizontal base on the frame, a vertical standard rising from said base at the front end of the truck, a vertical power-driven shaft within the standard, a gear wheel axially mounted thereon in a sliding relation thereto for rotation with said shaft, a member mounted upon the standard in a vertical sliding engagement therewith, screw means secured to the standard by intermediate means for adjustment of the vertical position of said member, a gear wheel mounted for rotation within said member but being constantly in mesh with the gear wheel mounted upon power-driven shaft within the standard, a box mounted upon the vertically-slidable member, an arbor journalled within the box and extending therefrom, a circular saw mounted on said arbor, and gear means axially keyed to said arbor, said gear means being driven by the gear wheel within the vertically-sliding member.

3. A power saw including a wheeled truck, a horizontal frame at one end pivotally supported thereby, screw means to raise the frame to a position slanting from the front downwardly, a base mounted on said frame, screw means to move the base longitudinally upon said frame, a standard at the front end of the base, a vertical power-driven shaft journalled within the standard, a sliding gear wheel axially mounted upon the shaft for rotation therewith, a member mounted upon the standard at the front thereof in a vertically-sliding relation thereto, screw means to adjust the vertical position of the member upon said standard, a gear wheel mounted in the member for constant engagement with the gear wheel mounted upon said power-driven shaft, a box mounted upon said member at the front thereof, an arbor journalled within the box and extending therefrom, a circular saw mounted on said arbor, and gear means operatively connected to the gear wheel in the vertically-sliding member to rotate said arbor.

4. A power saw including a wheeled truck, a horizontal frame at one end pivotally supported thereby, screw means to raise the frame to a position slanting from the front downwardly, a base mounted on said frame, screw means to move the base longitudinally upon said frame, a standard at the front end of the base, a vertical power-driven shaft journalled within the standard, a sliding gear wheel axially mounted upon the shaft for rotation therewith, a member mounted upon the standard at the front thereof in a vertically-sliding relation thereto, screw means to adjust the vertical position of the member upon said standard, a gear wheel mounted in the member for constant engagement with the gear wheel mounted upon said power-driven shaft, a box mounted upon said member at the front thereof, an arbor journalled within the box and extending downwardly therefrom, the box, with the arbor, being adapted to be turned and secured in place at right angle to its initial position, a circular saw mounted on said arbor, and gear means operatively connected to the gear wheel in the vertically-sliding member to rotate said arbor.

5. In a power saw, a base, a standard at one end thereof, a vertical power-driven shaft within the standard, a gear wheel axially mounted on the shaft in a vertically-sliding relation thereto, a member secured to the standard at the front thereof in a vertically sliding relation thereto, means to adjust the vertical position of the member on said standard, a box carried by the vertically-sliding member, an arbor journalled within the box and extending therefrom, a circular saw axially keyed to the end of the arbor, externally of the box, a horizontally-disposed shaft journalled within said vertically-sliding member, gear means at one end of the last-named shaft constantly in mesh with the gear wheel on the power-driven shaft, and gear means at the other end of the horizontally-disposed shaft to impart, by intermediate means, a rotary movement to said arbor.

6. In a power saw, a base, a standard at one end thereof, a power-driven vertical shaft journalled within the standard for rotation about its axis, a gear wheel axially mounted on the shaft in a vertically-sliding relation thereto, a member secured to the standard at the front thereof in a vertically-sliding relation thereto, means to adjust the vertical position of the member on said standard, a box carried by the vertically-sliding member, an arbor journalled within the box and extending therefrom, a circular saw axially keyed to the end of the arbor, externally of the box, a horizontally-disposed shaft journalled within said vertically-sliding member, gear means at one end of the last-named shaft constantly in mesh with the gear wheel on the vertical shaft, and gear means at the other end of the horizontally-disposed shaft to impart, by intermediate means, a rotary movement to said arbor.

References Cited in the file of this patent

UNITED STATES PATENTS

| | | |
|---|---|---|
| 1,447,606 | Seymour | Mar. 6, 1923 |
| 2,412,704 | Jaques | Dec. 17, 1946 |
| 2,580,110 | Mabry | Dec. 25, 1951 |
| 2,713,363 | Ryals | July 19, 1955 |

FOREIGN PATENTS

| | | |
|---|---|---|
| 542,508 | France | May 18, 1922 |